United States Patent
Jang et al.

(10) Patent No.: US 11,567,748 B2
(45) Date of Patent: Jan. 31, 2023

(54) INTERFACE DEVICE HAVING UPDATABLE FIRMWARE, MOBILE DEVICE, AND FIRMWARE UPDATE METHOD

(71) Applicant: Samsung Electronics Co., Ltd., Suwon-si (KR)

(72) Inventors: Jinho Jang, Suwon-si (KR); Sanghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 16/956,539

(22) PCT Filed: Dec. 5, 2018

(86) PCT No.: PCT/KR2018/015291
§ 371 (c)(1),
(2) Date: Jun. 19, 2020

(87) PCT Pub. No.: WO2019/124826
PCT Pub. Date: Jun. 27, 2019

(65) Prior Publication Data
US 2022/0137947 A1    May 5, 2022

(30) Foreign Application Priority Data
Dec. 20, 2017    (KR) .................. 10-2017-0176536

(51) Int. Cl.
*G06F 8/65*    (2018.01)
*G06F 8/71*    (2018.01)

(52) U.S. Cl.
CPC . *G06F 8/65* (2013.01); *G06F 8/71* (2013.01)

(58) Field of Classification Search
CPC ............. G06F 8/65; G06F 8/71; G06F 3/0488
See application file for complete search history.

(56) References Cited

U.S. PATENT DOCUMENTS

| 7,565,691 B2 | 7/2009 | Kitani |
| 8,353,140 B2 | 1/2013 | Pervan et al. |

(Continued)

FOREIGN PATENT DOCUMENTS

| JP | 5485277 B2 * | 5/2014 | ............... G06T 3/40 |
| KR | 10-2014-0078431 A | 6/2014 | |

(Continued)

OTHER PUBLICATIONS

Heuser et al., "ASM: A Programmable Interface for Extending Android Security", 2014, CASED (Year: 2014).*

(Continued)

*Primary Examiner* — Wei Y Zhen
*Assistant Examiner* — Junchun Wu

(57) ABSTRACT

According to an embodiment disclosed herein, an interface device to be connected to an external mobile device may comprise: a connector; at least one integrated circuit (IC); a memory for storing firmware for the at least one IC and instructions; and at least one processor configured to execute the stored instructions, wherein the instructions, when executed by the processor, cause the processor to: transmit identification data of the interface device, including data associated with the firmware, to the external mobile device through the connector when the interface device is connected to the external mobile device through the connector; receive firmware update data for the at least one IC, which corresponds to the identification data, from the external mobile device through the connector; verify the integrity of the firmware update data; and update the firmware stored in the memory by using the firmware update data when the integrity of the firmware update data has been verified.

15 Claims, 11 Drawing Sheets

(56) References Cited

U.S. PATENT DOCUMENTS

| | | | |
|---|---|---|---|
| 8,499,521 B2 | 8/2013 | Pervan et al. | |
| 8,589,302 B2* | 11/2013 | Prakash | G06F 9/4408 |
| | | | 705/50 |
| 8,898,654 B2 | 11/2014 | Young et al. | |
| 9,218,178 B2 | 12/2015 | Young et al. | |
| 9,735,525 B2 | 8/2017 | Liao | |
| 10,073,966 B2* | 9/2018 | Oberg | G06F 21/51 |
| 10,206,114 B2 | 2/2019 | Choi et al. | |
| 10,887,770 B2* | 1/2021 | Choi | H04W 12/10 |
| 10,958,435 B2* | 3/2021 | Spanier | H04L 9/3247 |
| 2004/0194081 A1* | 9/2004 | Qumei | G06F 8/65 |
| | | | 717/173 |
| 2005/0198529 A1 | 9/2005 | Kitani | |
| 2009/0320012 A1* | 12/2009 | Lee | G06F 8/65 |
| | | | 714/758 |
| 2013/0111455 A1* | 5/2013 | Li | H04L 9/3239 |
| | | | 717/169 |
| 2013/0185563 A1* | 7/2013 | Djabarov | H04L 67/34 |
| | | | 717/173 |
| 2014/0068585 A1* | 3/2014 | Young | G06F 21/572 |
| | | | 717/168 |
| 2014/0068594 A1 | 3/2014 | Young et al. | |
| 2015/0261521 A1 | 9/2015 | Choi et al. | |
| 2016/0085995 A1* | 3/2016 | Poornachandran | G06F 21/55 |
| | | | 726/34 |
| 2016/0132315 A1* | 5/2016 | Yu | G06F 15/167 |
| | | | 717/173 |
| 2016/0147525 A1* | 5/2016 | Choi | G06F 8/65 |
| | | | 717/173 |
| 2016/0365689 A1 | 12/2016 | Liao | |
| 2017/0054310 A1 | 2/2017 | Chen et al. | |
| 2017/0126860 A1 | 5/2017 | Evans, V et al. | |
| 2017/0126861 A1 | 5/2017 | Evans, V et al. | |
| 2017/0249271 A1 | 8/2017 | Gagne-Keats et al. | |
| 2017/0374080 A1* | 12/2017 | Boone | H04L 67/568 |
| 2020/0336312 A1* | 10/2020 | Pope | G06F 21/76 |
| 2022/0075614 A1* | 3/2022 | Solnit | G09C 1/00 |

FOREIGN PATENT DOCUMENTS

| | | |
|---|---|---|
| KR | 10-2015-0048136 A | 5/2015 |
| KR | 10-2015-0106219 A | 9/2015 |
| KR | 10-2015-0120640 A | 10/2015 |
| KR | 10-1563441 B1 | 10/2015 |
| KR | 101563441 B1 * | 10/2015 |
| KR | 20150120640 A * | 10/2015 |

OTHER PUBLICATIONS

Shuanghe et al., "Design and Implementation of Portable TPM Device Driver based on Extensible Firmware Interface", 2009, IEEE (Year: 2009).*
Choi et al., "Secure Firmware Validation and Update for Consumer Devices in Home Networking", 2016, IEEE (Year: 2016).*
Liu et al., "Security Analysis of Vendor Customized Code in Firmware of Embedded Device", 2017, ICST (Year: 2017).*
International Search Report dated Mar. 13, 2019 in connection with International Patent Application No. PCT/KR2018/015291, 2 pages.
Written Opinion of the International Searching Authority dated Mar. 13, 2019 in connection with International Patent Application No. PCT/KR2018/015291, 7 pages.

* cited by examiner

INTERFACE DEVICE HAVING UPDATABLE FIRMWARE, MOBILE DEVICE, AND FIRMWARE UPDATE METHOD

CROSS-REFERENCE TO RELATED APPLICATIONS

This application is a 371 of International Application No. PCT/KR2018/015291 filed on Dec. 5, 2018, which claims priority to Korean Patent Application No. 10-2017-0176536 filed on Dec. 20, 2017, the disclosures of which are herein incorporated by reference in their entirety.

BACKGROUND

1. Field

Embodiments disclosed in the disclosure relate to a technology for updating firmware of an interface device.

2. Description of Related Art

An interface device for outputting a screen rendered by a mobile device to an external display device has been developed to increase utilization of the mobile device.

Such an interface device includes not only a port for the screen output, but also a USB port, a wired LAN port, a power port, an audio port, and the like, thereby improving usability of the mobile device.

The interface device may include a plurality of integrated circuits (ICs) for providing various functions. Such an interface device does not support firmware update for the IC, so that there is a problem in that the interface device is limited in function enhancement and is vulnerable to security problems. In addition, the interface device does not support a genuine product certification function, so that there is a problem that counterfeits may be manufactured.

Various embodiments of the disclosure are intended to improve security and safety of the interface device by verifying integrity of firmware update data, as well as to enable genuine product certification of the interface device.

SUMMARY

An aspect of the disclosure provides an interface device connected to an external mobile device including a connector, at least one integrated circuit (IC), a memory for storing firmware and instructions for the at least one IC, and at least one processor, wherein the processor executes the instructions to, when being connected to the external mobile device through the connector, transmit identification data of the interface device including data associated with the firmware to the external mobile device through the connector, receive firmware update data corresponding to the identification data and for the at least one IC from the external mobile device through the connector, verify integrity of the firmware update data, and update the firmware stored in the memory using the firmware update data when the firmware update data is integral.

Another aspect of the disclosure provides an electronic device including a connector, a wireless communication circuit, a memory for storing instructions, and at least one processor, wherein the processor executes the instructions to, when being connected to an external interface device through the connector, receive identification data of the external interface device including data associated with firmware associated with at least one IC included in the external interface device from the external interface device through the connector, determine whether the external interface device satisfies a specified condition based at least on the identification data, request firmware update data associated with the at least one IC to an external server through the wireless communication circuit based on the identification data when the external interface device satisfies the specified condition, receive the firmware update data associated with the at least one IC from the external server through the wireless communication circuit, and transmit the received firmware update data for the at least one IC to the external interface device through the connector.

Another aspect of the disclosure provides a method for updating firmware by an interface device including transmitting identification data of the interface device including data associated with firmware associated with at least one IC to an external mobile device when being connected to the external mobile device, receiving firmware update data corresponding to the identification data and for the at least one IC from the external mobile device, verifying integrity of the firmware update data, and updating the firmware stored in a memory and associated with the at least one IC using the firmware update data when the firmware update data is integral.

According to the embodiments disclosed in the disclosure, integrity for the IC of the interface device may be identified by verifying whether the interface device is a genuine product.

In addition, according to the embodiments disclosed in the disclosure, the safety of the interface device may be improved by verifying integrity of the firmware data to be installed in the interface device.

In addition, various effects that may be directly or indirectly identified through the disclosure may be provided.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
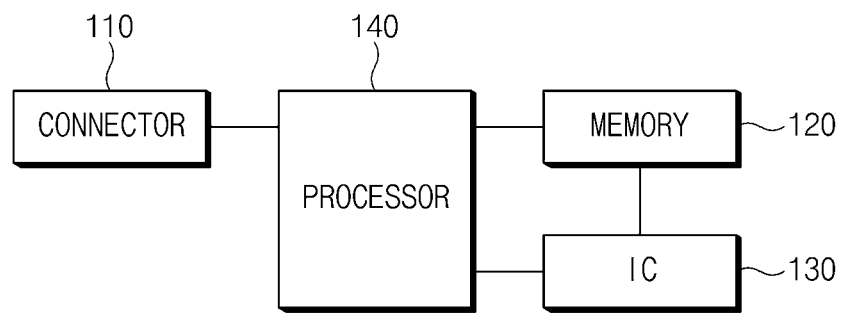
FIG. 1 illustrates a block diagram of an interface device according to one embodiment.

FIG. 1 illustrates a block diagram of an interface device according to one embodiment.

According to an embodiment, an interface device may include a connector 110, a memory 120, at least one integrated circuit (IC) 130, a processor 140, and the like. According to an embodiment, the interface device may further include a component not illustrated in FIG. 1. For example, the interface device may further include a port (e.g., a HDMI port, a RJ45 port, a USB port, and the like) for connection with an external accessory device or an external electronic device.

The connector 110 may connect the interface device to an external mobile device. The connector 110 may be, for example, the USB-C type connector 110, the micro 5 pin connector 110, the lightening connector 110, or the like.

The memory 120 may store firmware for the at least one IC 130 and instructions executed by the processor 140. According to an embodiment, the firmware may be a micro program that controls the at least one IC 130. According to an embodiment, the firmware stored in the memory 120 may be updated For providing functions of the interface device, the at least one IC 130 may perform an operation corresponding to each function. For example, the at least one IC 130 may include at least one of an DP to HDMI IC, a USB codec IC, a LAN IC, an upstream power delivery IC (upstream PD IC) and a downstream power delivery IC (downstream PD IC). According to an embodiment, the at least one IC 130 may perform an operation based on the firmware stored in the memory 120.

The processor 140 may control overall operations of the interface device. According to an embodiment, the processor 140 may transmit identification data of the interface device to the external mobile device through the connector 110. According to an embodiment, the processor 140 may verify integrity (e.g., whether it is forged or falsified) of received firmware update data. According to an embodiment, the processor 140 may update the firmware stored in the memory 120 using the firmware update data.

Figure 2:
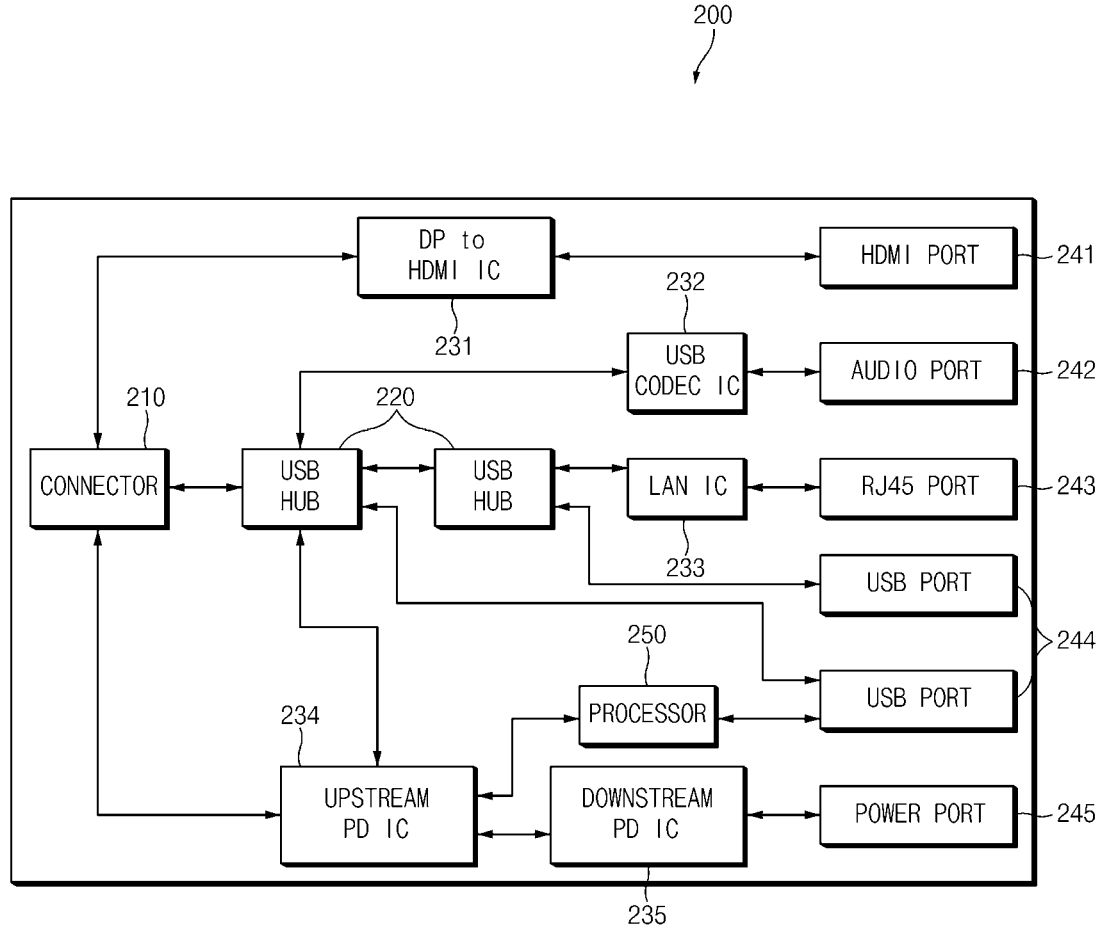
FIG. 2 is a block diagram illustrating a physical configuration of an interface device according to one embodiment.

FIG. 2 is a block diagram illustrating a physical configuration of an interface device according to one embodiment.

Referring to FIG. 2, an interface device 200 may include a connector 210 (e.g., the connector 110 in FIG. 1), a USB hub 220, a plurality of ICs 231 to 235 (e.g., the at least one IC 130 in FIG. 1), a plurality of ports 241 to 245, and a processor 250 (e.g., the processor 140 in FIG. 1).

The connector 210 may connect the interface device 200 and the external mobile device with each other. According to an embodiment, connector 210 may be connected to a connector of the external mobile device.

The USB hub 220 may allow one USB port 244 to be expanded to multiple ports, so that more ports may be used for the device connection. According to an embodiment, the USB hub 220 may be connected between the connector 210 and the plurality of ICs to enable the plurality of ICs to communicate with the external mobile device. According to an embodiment, the USB hub 220 may be connected to another USB hub 220 to further increase the number of USB port 244.

The plurality of ICs may include the DP to HDMI IC 231, the USB codec IC 232, the LAN IC 233, the upstream PD IC 234, and the downstream PD IC 235.

The DP to HDMI IC 231 may mirror a screen output by the external mobile device connected through the connector 210. For example, the DP to HDMI IC 231 may convert a signal output from the external mobile device to a signal to be output to a high definition multimedia interface (HDMI) port 241.

The USB codec IC 232 may convert audio data output from the external mobile device connected through the connector 210 into an analog audio signal and output the analog audio data to an audio port 242. According to an embodiment, the USB codec IC 232 may convert the audio signal input to the audio port 242 into audio data and output the audio data to the external mobile device.

The LAN IC 233 may support communication between a wired LAN and a USB. For example, one end of the LAN IC 233 may be connected to the connector 210 or the USB hub 220 and the other end thereof may be connected to a RJ45 port 243. In another example, data in a USB format may be converted into data for Ethernet communication, or vice versa. According to an embodiment, the external mobile device connected to the connector 210 may use wired Internet through the LAN IC 233 and the RJ45 port 243.

The upstream PD IC 234 may be in communication with the external mobile device connected through the connector 210. For example, the upstream PD IC 234 may transmit identification data of the interface device 200 to the external mobile device through the connector 210 under control of the processor 250. In another example, the upstream PD IC 234 may receive the firmware update data from the external mobile device. According to various embodiments, the upstream PD IC 234 may update the firmware for the IC stored in the memory using the received firmware update data.

The downstream PD IC 235 may control power supply of the interface device 200.

The plurality of ports may include the HDMI port 241, the audio port 242, the RJ45 port 243, the USB port 244, and a power port 245.

The HDMI port 241 may be connected to the external display device through an HDMI cable. The HDMI port 241 may transmit the signal output from the DP to HDMI IC 231 to the external di splay device.

The audio port 242 may accommodate an audio plug (e.g., a 3.5 pie (Ψ) plug) and the like therein. According to an embodiment, the audio port 242 may transmit the audio signal output from the USB codec IC 232 to an external audio output device. According to an embodiment, the audio port 242 may transmit an audio signal input from the external audio input device to the USB codec IC 232.

The RJ45 port 243 is a port to which a LAN cable may be connected.

The USB port 244 is a port to which an external device (e.g., a USB memory, an external electronic device, or the like) may be connected.

The power port 245 may transfer power supplied from an external power supply to the interface device 200. The power supplied through the power port 245 may be controlled by the downstream PD IC 235.

The processor 250 may control overall operations of the interface device 200. According to an embodiment, the processor 250 may operate as a secure element in the interface device 200. According to various embodiments, the processor 250 may be implemented as an IC.

Figure 3:
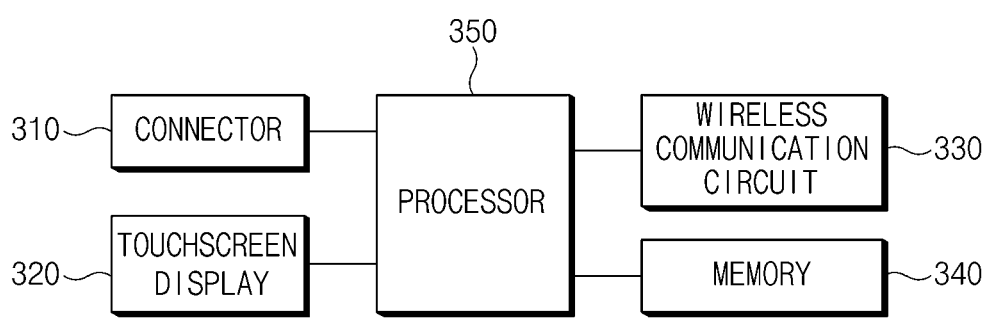
FIG. 3 illustrates a block diagram of a mobile device according to one embodiment.

FIG. 3 illustrates a block diagram of a mobile device according to one embodiment.

According to an embodiment, a mobile device may include a connector 310, a touchscreen display 320, a wireless communication circuit 330, a memory 340, a processor 350, and the like.

The connector 310 may be a connection port for connecting the mobile device to an external interface device. The connector 310 may be, for example, the USB-C type connector 310, the micro 5 pin connector 310, the lightning connector 310, or the like.

The touchscreen display 320 may output an execution screen of an application (e.g., an execution screen associated with a quick charge UI or firmware update) and the like. In an embodiment, the touchscreen display 320 may be implemented with a touch panel to receive a touch input from a user.

The wireless communication circuit 330 may allow the mobile device to wirelessly communicate with an external server, an external device, or the like.

The memory 340 may store instructions executed by the processor 350. According to an embodiment, the memory 340 may further store an application program for controlling the interface device.

The processor 350 may control overall operations of the mobile device. According to an embodiment, the processor 350 may use the identification data received from the interface device to determine whether the interface device satisfies a specified condition. For example, the processor 350 may verify whether the interface device is a genuine product. According to an embodiment, the processor 350 may determine whether the interface device supports a security function based on the identification data received from the interface device. In an embodiment, the processor 350 may request firmware update data to the external server based on whether the interface device supports the security function.

Figure 4:
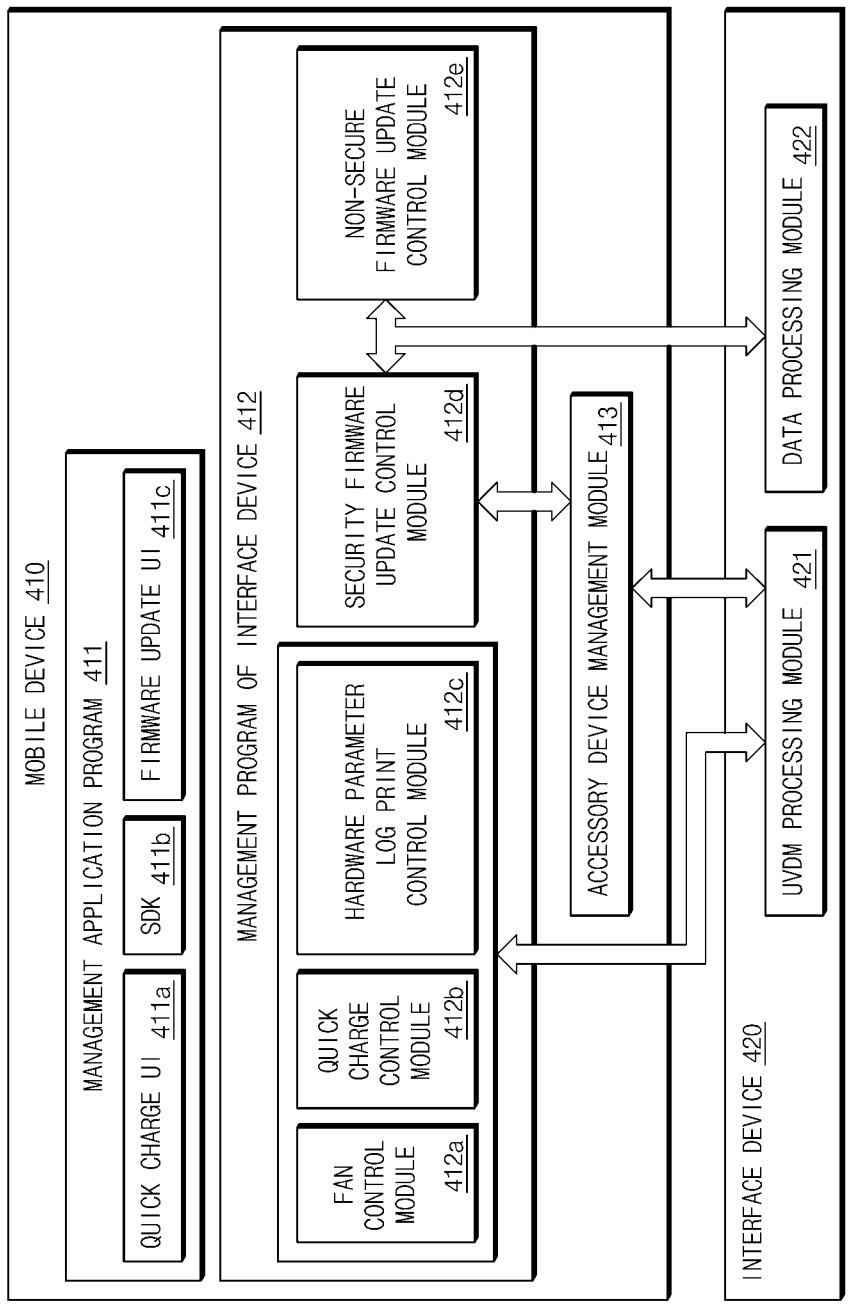
FIG. 4 is a block diagram illustrating software modules of a mobile device and an interface device according to one embodiment.

FIG. 4 is a block diagram illustrating software modules of a mobile device and an interface device according to one embodiment.

According to an embodiment, the processor 350 of the mobile device and the processor 140 of the interface device may respectively execute the instructions stored in the memories 120 and 340 of the respective devices to implement various modules illustrated in FIG. 4. Accordingly, it may be understood that operations performed by the following modules are performed by the processors 140 and 350 of the respective corresponding devices.

Referring to FIG. 4, a mobile device 410 (e.g., the mobile device in FIG. 3) may include a management application program, an interface device management program, and an accessory device management module.

According to an embodiment, a management application program 411 may include a quick charge UI 411a, a software development kit (SDK) 411b, and a firmware update UI 411c.

The quick charge UI 411a may provide, to the user, an object that allows the user to select whether to charge the mobile device 410 in a quick charge mode.

The SDK 411b is a module for debugging data collected by a hardware parameter log print control module 412c or transmitting the data to the external server.

The firmware update UI 411c may provide a firmware version of an interface device 420 (e.g., the interface device in FIG. 1) to the user, and provide an object that allows the user to select whether to update firmware of the interface device 420 to the user.

According to an embodiment, a management program 412 of the interface device 420 may include a fan control module, a quick charge control module 412b, the hardware parameter log print control module, a security firmware update control module 412d, and a non-secure firmware update control module.

A fan control module 412a may generate an unstructured vendor defined message (UVDM) that controls driving of a fan of the interface device 420 based on a state of the mobile device 410 (e.g., a temperature of the mobile device), and transmit the generated UVDM to the interface device 420.

The quick charge control module 412b may generate a UVDM that controls power to be supplied to the mobile device 410 by the interface device 420 based on user's selection through the quick charge UI 411a, and transmit the generated UVDM.

The hardware parameter log print control module 412c may collect information on a state, a configuration, or the version of the interface device 420 and store the information as a log. According to an embodiment, the hardware parameter log print control module 412c may store state information that is being executed internally as a log when an error occurs in the interface device 420.

The security firmware update control module 412d is a control module for updating the firmware of the interface device 420 supporting the security function. According to an embodiment, the security firmware update control module 412d may determine whether the interface device 420 supports the security function through an accessory device management module 413. According to an embodiment, when the interface device 420 supports the security function, the security firmware update control module 412d may transmit encrypted firmware update data to the interface device 420.

A non-secure firmware update control module 412e is a control module for updating the firmware of the interface device 420 that does not support the security function. According to an embodiment, when the interface device 420 does not support the security function, the non-secure firmware update control module 412e may transmit unencrypted firmware update data to the interface device 420.

According to an embodiment, the accessory device management module 413 may use identification data received from the interface device 420 to determine whether the interface device 420 is a genuine product and whether the interface device 420 supports the security function.

The interface device 420 may include a UVDM processing module and a data processing module.

A UVDM processing module 421 may control the interface device 420 based on the UVDM received from the fan control module 412a, the quick charge control module 412b, or the accessory device management module 413 of the mobile device 410.

A data processing module 422 may receive the firmware update data from the security firmware update control module 412d or the non-secure firmware update control module 412e.

Hereinafter, it is assumed that the interface device in FIG. 1 and the mobile device in FIG. 3 perform processes in FIGS. 5 and 6. An operation described as being performed by the interface device may be implemented as instructions that may be performed (or executed) by the processor 140 of the interface device. The instructions may be stored in, for example, a computer recording medium or the memory 120 of the interface device illustrated in FIG. 1. An operation described as being performed by the mobile device may be implemented as instructions that may be performed (or executed) by the processor 350 of the mobile device. The instructions may be stored in, for example, a computer recording medium or the memory 340 of the mobile device illustrated in FIG. 3.

Figure 5:
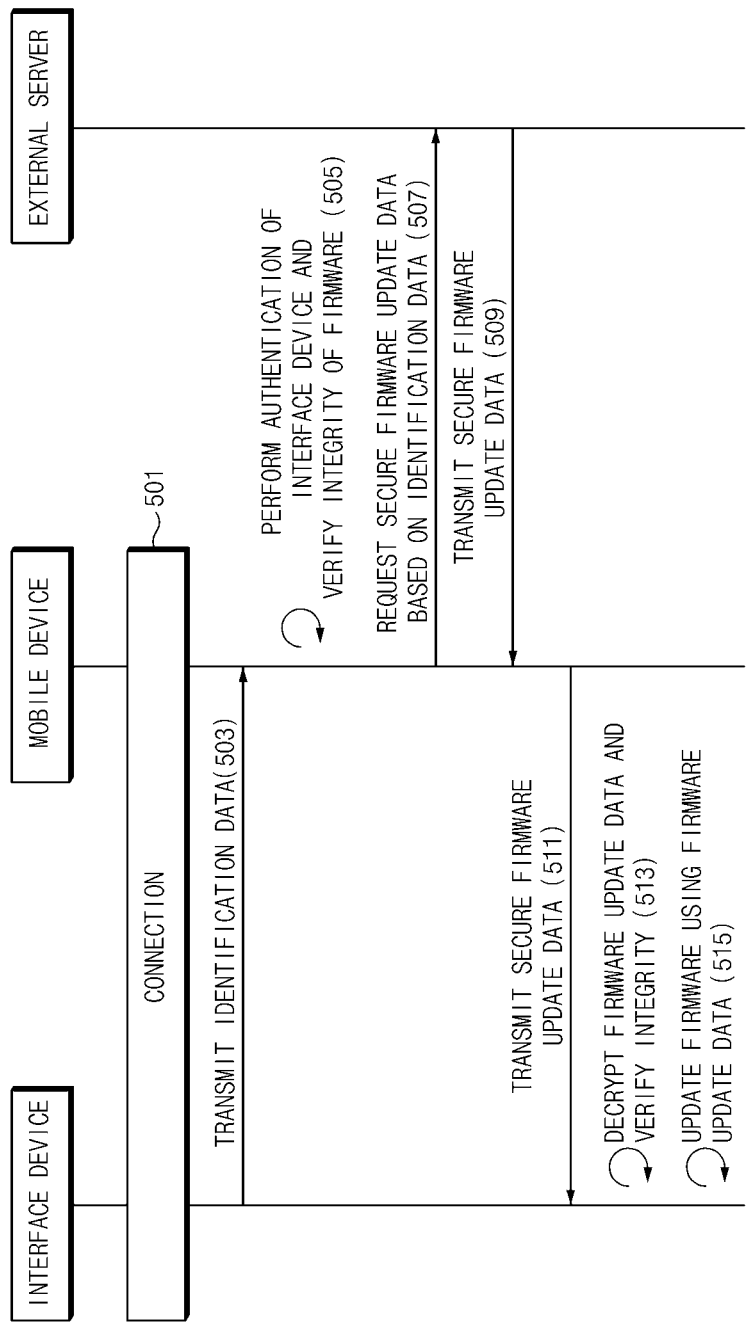
FIG. 5 is a flowchart illustrating a firmware update method of an interface device according to one embodiment.

FIG. 5 is a flowchart illustrating a firmware update method of an interface device according to one embodiment.

In operation 501, the interface device and the mobile device may be connected to each other. According to an embodiment, the connector 110 of the interface device and the connector 310 of the mobile device may be connected to each other.

In operation 503, the processor 140 of the interface device may transmit the identification data of the interface device including data associated with the firmware for the at least one IC to the mobile device.

According to an embodiment, the identification data may include at least some of information about whether the interface device supports the security function, information about the IC included in the interface device, and a unique serial number of the interface device. According to an embodiment, the identification data may include at least one of firmware information (e.g., a firmware version, a recent firmware update time, or the like) of the IC included in the interface device and data (e.g., a hash value and the like) to verify whether the firmware is integral as the data associated with the firmware for the at least one IC.

In operation 505, the processor 350 of the mobile device may use the identification data to determine whether the interface device satisfies the specified condition.

According to an embodiment, the processor 350 of the mobile device may verify whether the interface device is the genuine product.

According to an embodiment, the processor 350 of the mobile device may verify whether the interface device is the genuine product using the serial number included in the identification data. For example, the processor 350 of the mobile device may verify whether the interface device is the genuine product using a genuine product verification algorithm stored in advance in the memory 340. According to various embodiments, the processor 350 of the mobile device may use a verification method other than the illustrated genuine product verification method.

In operation 507, when the interface device satisfies the specified condition, the processor 350 of the mobile device may request firmware update data for the at least one IC based on the identification data to the external server through the wireless communication circuit.

According to an embodiment, the identification data may include the information on whether the interface device supports the security function.

According to an embodiment, when it is determined that the interface device supports the security function, the processor 350 of the mobile device may request secure firmware update data to the external server through the wireless communication circuit.

According to an embodiment, when it is determined that the interface device does not support the security function, the processor 350 of the mobile device may transmit non-secure firmware update data to the external server through the wireless communication circuit.

According to an embodiment, the processor 350 of the mobile device may receive a user input of selecting an IC to update firmware among the at least one IC through the touchscreen display 320. According to an embodiment, the processor 350 of the mobile device may request firmware update data for the selected IC to the external server through the wireless communication circuit 330.

Following operations 509 to 515 are assumed to be operations performed when the interface device is determined to support the security function.

Operations of the mobile device and the interface device when it is determined that the interface device according to an embodiment does not support the security function will be described with reference to FIG. 6.

In operation 509, the processor 350 of the mobile device may receive the firmware update data for the at least one IC from the external server through the wireless communication circuit 330.

According to an embodiment, the processor 350 of the mobile device may receive the secure firmware update data. According to an embodiment, the secure firmware update data may be encrypted data. According to an embodiment, the processor 350 of the mobile device may further receive a hash value of the secure firmware update data.

In operation 511, the processor 140 of the interface device may receive the firmware update data for the at least one IC from the mobile device through the connector 110.

According to an embodiment, when the interface device supports the security function, the identification data of the interface device may include information indicating that the security function is supported, and the processor 140 of the interface device may receive the secure firmware update data. In other words, the processor 140 of the interface device may receive the firmware update data corresponding to the identification data.

According to an embodiment, the processor 140 of the interface device may further receive the hash value of the firmware update data from the mobile device.

In operation 513, the processor 140 of the interface device may verify the integrity of the firmware update data.

According to an embodiment, the processor 140 of the interface device may verify the integrity of the firmware update data using the hash value of the firmware update data. For example, the processor 140 of the interface device may verify whether the firmware update data is forged or falsified.

In operation 515, when the firmware update data is integral, the processor 140 of the interface device may update the firmware for the at least one IC stored in the memory 120 using the firmware update data.

According to an embodiment, the processor 140 of the interface device may store the firmware update file in the memory 120. When a specified event occurs according to an embodiment, the firmware for the at least one IC stored in the memory 120 may be updated using the stored firmware update data. For example, when firmware update is not completed because of occurrence of an error while the processor of the interface is performing the firmware update, the processor 140 of the interface device may use the stored firmware update data to update the firmware for the at least one IC stored in the memory 120.

According to various embodiments, the processor 140 of the interface device may generate a hash value of the updated firmware, and store the generated hash value of the firmware in the memory 120. The processor 140 of the interface device may update the firmware for the at least one IC stored in the memory 120 and then verify the integrity of the firmware for the at least one IC stored in the memory 120 using the stored hash value of the firmware. According to various embodiments, the processor 140 of the interface device may update the firmware for the at least one IC stored in the memory 120 and then periodically verify the integrity of the firmware for the at least one IC stored in the memory 120 using the stored hash value of the firmware. According to various embodiments, the processor 140 of the interface device may update the firmware for the at least one IC stored in the memory 120 and then verify the integrity of the firmware for the at least one IC stored in the memory 120 using the stored hash value of the firmware when the interface device is powered on.

Figure 6:
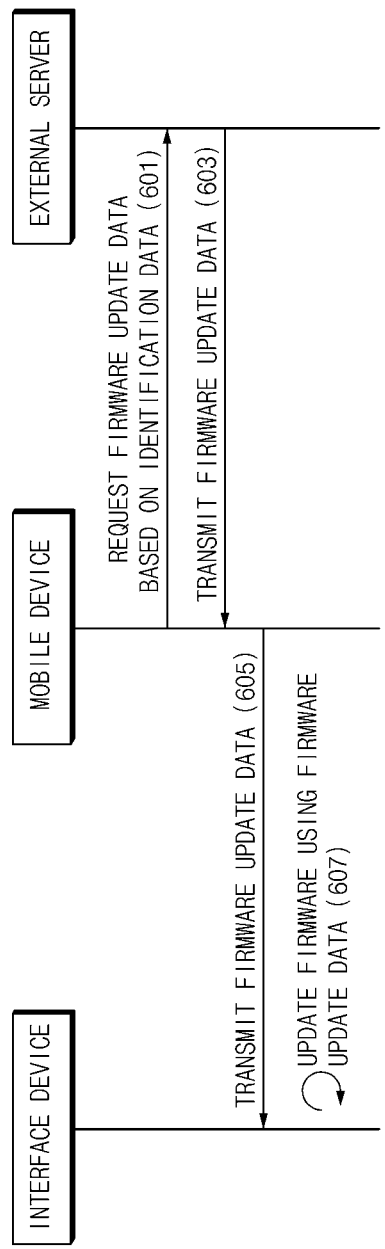
FIG. 6 is a flowchart illustrating a firmware update method of an interface device that does not support a security function according to one embodiment.

FIG. 6 is a flowchart illustrating a firmware update method of an interface device that does not support a security function according to one embodiment.

In operation 601, the processor 350 of the mobile device may request the firmware update data for the at least one IC based on the identification data to the external server through the wireless communication circuit 330.

According to an embodiment, when it is determined that the interface device does not support the security function, the processor 350 of the mobile device may request the non-secure firmware update data to the external server through the wireless communication circuit 330.

In operation 603, the processor 140 of the interface device may receive the firmware update data for the at least one IC from the external server through the wireless communication circuit 330.

According to an embodiment, the processor 350 of the mobile device may receive the non-secure firmware update data.

In operation 605, the processor 140 of the interface device may receive the firmware update data for the at least one IC from the mobile device through the connector 110.

According to an embodiment, when the interface device does not support the security function, the identification data of the interface device may include information indicating that the security function is not supported, and the processor 140 of the interface device may receive the non-secure firmware update data. In other words, the processor 140 of the interface device may receive the firmware update data corresponding to the identification data.

In operation 607, the processor 140 of the interface device may update the firmware for the at least one IC stored in the memory 120 using the firmware update data.

According to various embodiments, in operation 503, the processor 140 of the interface device may transmit the identification data of the interface device including the data associated with the firmware for the plurality of ICs to the mobile device through the connector.

According to an embodiment, the plurality of ICs may include at least one first IC set to update the firmware in a secure firmware update method and at least one second IC set to update the firmware in a non-secure firmware update method.

In operation 507, the processor 350 of the mobile device may request the secure firmware update data for the first IC as each of some of the plurality of ICs and the non-secure firmware update data for the second IC as each of the others of the plurality of ICs to the external server through the wireless communication circuit 330.

After operation 507, the processor 350 of the mobile device may receive the firmware update data for the plurality of ICs from the external server through the wireless communication circuit 330.

According to an embodiment, the processor 350 of the mobile device may receive the secure firmware update data for the first IC and the non-secure firmware update data for the second IC. According to an embodiment, the secure firmware update data for the first IC may be encrypted data.

According to an embodiment, the processor 350 of the mobile device may further receive a hash value of the secure firmware update data for the first IC. According to an embodiment, the non-secure firmware update data for the second IC may be unencrypted data.

Thereafter, the processor 350 of the mobile device may transmit the received firmware update data for the plurality of ICs through the connector to the interface device.

According to an embodiment, the processor 140 of the interface device may verify the integrity of the firmware update data for the first IC, which is each of some of the plurality of ICs, among firmware update data for the plurality of ICs.

According to an embodiment, when the firmware update data for the first IC is integral, the processor 140 of the interface device may update the firmware for the first IC stored in the memory 120 using the firmware update data for the first IC. According to an embodiment, the processor 140 of the interface device may not perform integrity verification of the firmware update data for the second IC and update the firmware for the second IC stored in the memory 120 using the firmware update data for the second IC.

Hereinafter, with reference to FIGS. 7 to 9, it will be described again that each component of the interface device, the mobile device, and the external server perform the above-described operations.

Figure 7:
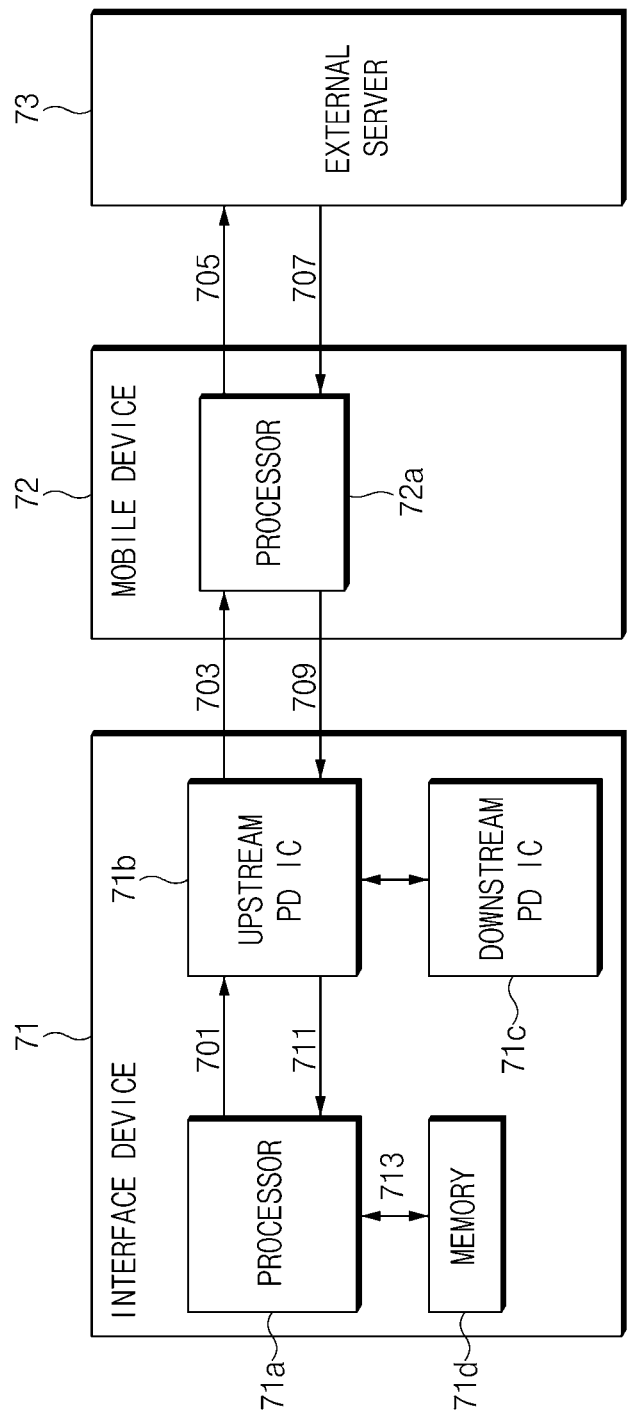
FIG. 7 is a diagram illustrating that an interface device that supports a security function, a mobile device, and an external server according to one embodiment update firmware of the interface device.
Figure 8:
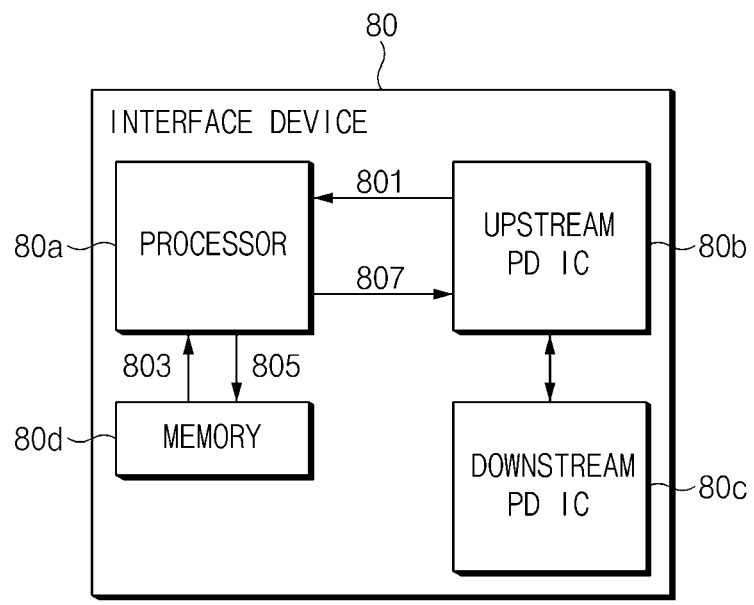
FIG. 8 is a diagram illustrating that an interface device according to one embodiment updates firmware when a specified event occurs.
Figure 9:
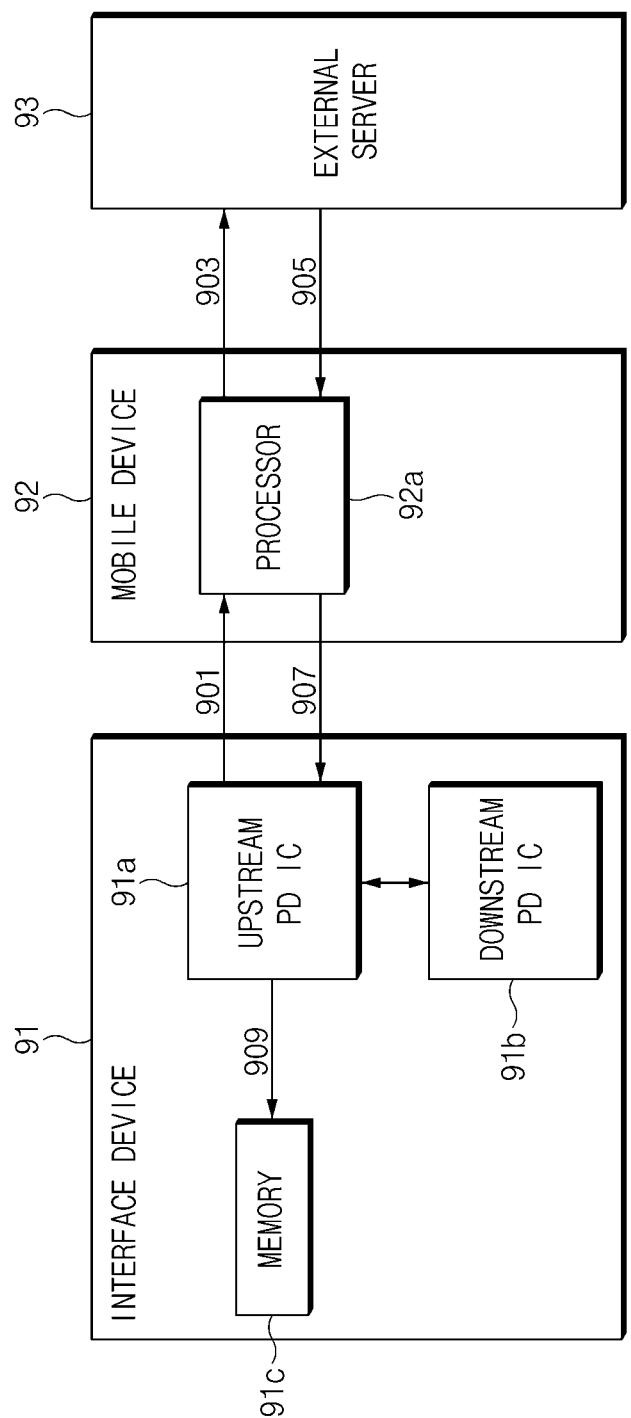
FIG. 9 is a diagram illustrating that an interface device that does not support a security function, a mobile device, and an external server according to one embodiment update firmware of the interface device.

Interface devices 71, 80, and 91 respectively illustrated in FIGS. 7 to 9 may correspond to the interface devices in FIGS. 1 and 2. Further, mobile devices 72 and 92 may correspond to the mobile device in FIG. 3. According to an embodiment, a processor 71a or 80a, an upstream PD IC 71b, 80b, or 91b, a downstream PD IC 71c, 80c, or 91b, and a memory 71d, 80d, or 91c in the interface device 71, 80, or 91 may communicate with each other in an inter integrated circuit (I2C) manner. According to an embodiment, the downstream PD IC 71c, 80c, or 91b may supply power to each component in the interface device 71, 80, or 91 through the upstream PD IC 71b, 80b, or 91b.

FIG. 7 is a diagram illustrating that an interface device that supports a security function, a mobile device, and an external server according to one embodiment update firmware of the interface device.

When the interface device 71 and the mobile device 72 are connected to each other, in operation 701, the processor 71a of the interface device 71 may control the upstream PD IC 71b to transmit, to the mobile device 72, identification data of the interface device 71 including data associated with firmware for at least one IC of the interface device 71.

In operation 703, the upstream PD IC 71b may transmit the identification data of the interface device 71 to the mobile device 72 through a connector.

According to an embodiment, operations 701 and 703 may correspond to operation 501 described above.

In operation 705, the processor 72a of the mobile device 72 may request firmware update data for the at least one IC based on the identification data to an external server 73 through a wireless communication circuit.

According to an embodiment, the processor 72a of the mobile device 72 may determine whether the interface device 71 satisfies a specified condition (e.g., whether the interface device 71 is a genuine product) using the identification data, and may request the firmware update data for the at least one IC to the external server 73 through the wireless communication circuit when the interface device 71 satisfies the specified condition.

According to an embodiment, when it is determined that the interface device 71 supports a security function based on the identification data, the processor 72a of the mobile device 72 may request the secure firmware update data to the external server 73 through the wireless communication circuit. According to an embodiment, when it is determined that the interface device 71 does not support the security function, the processor 72a of the mobile device 72 may request non-secure firmware update data to the external server 73 through the wireless communication circuit.

According to an embodiment, the processor 72a of the mobile device 72 may receive the identification data of the interface device 71 including data associated with firmware for a plurality of ICs. According to an embodiment, the processor 72a of the mobile device 72 may request the secure firmware update data for some of the plurality of ICs and the non-secure firmware update data for the others of the plurality of ICs to the external server 73 through the wireless communication circuit.

According to an embodiment, operation 705 may correspond to operation 505 and operation 507 described above.

In operation 707, the processor 72a of the mobile device 72 may receive the firmware update data for the at least one IC from the external server 73 through the wireless communication circuit.

According to an embodiment, the processor 72a of the mobile device 72 may receive firmware update data corresponding to a request of operation 705.

According to an embodiment, the secure firmware update data may be encrypted data. According to an embodiment, the processor 72a of the mobile device 72 may further receive a hash value of firmware update data.

According to an embodiment, operation 707 may correspond to operation 509 described above.

In operation 709, the processor 72a of the mobile device 72 may transmit the received firmware update data to the interface device 71 through the connector.

In operation 711, the upstream PD IC 71b may transmit the firmware update data received from the mobile device 72 to the processor 71a of the interface device 71.

According to an embodiment, operations 709 and 711 may correspond to operation 511 described above.

In operation 713, the processor 71a of the interface device 71 may update the firmware for the at least one IC stored in the memory 71d using the received firmware update data.

According to an embodiment, the firmware update data may be encrypted data, and the processor 71a of the interface device 71 may decrypt the encrypted firmware update data.

According to an embodiment, before updating the firmware, the processor 71a of the interface device 71 may verify whether the firmware update data is forged or falsified using the hash value of the firmware update data. According to an embodiment, when the firmware update data is integral, the processor 71a of the interface device 71 may update the firmware.

According to an embodiment, the processor 71a of the interface device 71 may store the received firmware update data in the memory 71d.

According to an embodiment, the processor 71a of the interface device 71 may generate a hash value of the updated firmware and store the generated hash value in the memory 71d. According to an embodiment, the processor 71a of the interface device 71 may verify integrity of the firmware using the hash value stored in the memory 71d after updating the firmware.

According to an embodiment, operation 713 may correspond to operations 513 and 515 described above.

FIG. 8 is a diagram illustrating that an interface device according to one embodiment updates firmware when a specified event occurs.

According to an embodiment, when a specified event occurs, the processor 80a of the interface device 80 may update firmware using firmware update data stored in the memory 80d. For example, when the update is not completed because of occurrence of an error while the processor 80a of the interface device 80 updates the firmware, the processor 80a of the interface device 80 may perform the firmware update again.

According to an embodiment, when the error occurs during the firmware update, an IC corresponding to the error-occurred firmware may notify the processor 80a of the occurrence of the error. In an embodiment below, it is assumed that the error has occurred during firmware update for the upstream PD IC 80b.

In operation 801, the upstream PD IC 80b may inform the processor 80a that the error has occurred during the firmware update of the upstream PD IC 80b.

In operation 803, the processor 80a of the interface device 80 may load the firmware update data stored in the memory 80d.

In operation 805, the processor 80a of the interface device 80 may update the firmware of the upstream PD IC 80b again using firmware update data.

In operation 807, the processor 80a of the interface device 80 may notify the upstream PD IC 80b that the firmware update is completed.

FIG. 9 is a diagram illustrating that an interface device that does not support a security function, a mobile device, and an external server according to one embodiment update firmware of the interface device.

According to an embodiment, an upstream PD IC 91a of the interface device 91 that does not support the security function may perform communication with the mobile device 92 and firmware update.

When the interface device 91 and the mobile device 92 are connected with each other, in operation 901, the upstream PD IC 91a may transmit identification data of the interface device 91 including data associated with firmware for at least one IC of the interface device 91 to the mobile device 92 through a connector.

According to an embodiment, operation 901 may correspond to operation 501 described above.

In operation 903, a processor 92a of the mobile device 92 may request firmware update data for the at least one IC based on the identification data to an external server 93 through a wireless communication circuit.

According to an embodiment, the processor 92a of the mobile device 92 may determine whether the interface device 91 satisfies a specified condition using the identification data, and request the firmware update data for the at least one IC to the external server 93 through the wireless communication circuit when the interface device 91 satisfies the specified condition.

According to an embodiment, the processor 92a of the mobile device 92 may determine that the interface device 91 does not support the security function, and the processor 92a of the mobile device 92 may request non-secure firmware update data to the external server 93 through the wireless communication circuit.

According to an embodiment, operation 903 may correspond to operation 601 described above.

In operation 905, the processor 92a of the mobile device 92 may receive the firmware update data for the at least one IC from the external server 93 through the wireless communication circuit.

According to an embodiment, the processor 92a of the mobile device 92 may further receive a hash value of the firmware update data.

According to an embodiment, operation 905 may correspond to operation 603 described above.

In operation 907, the processor 92a of the mobile device 92 may transmit the received firmware update data to the interface device 91 through the connector.

According to an embodiment, operation 907 may correspond to operation 605 described above.

In operation 909, the upstream PD IC 91a may update the firmware for the at least one IC stored in the memory 91c using the received firmware update data.

According to an embodiment, operation 909 may correspond to operation 607 described above.

Figure 10:
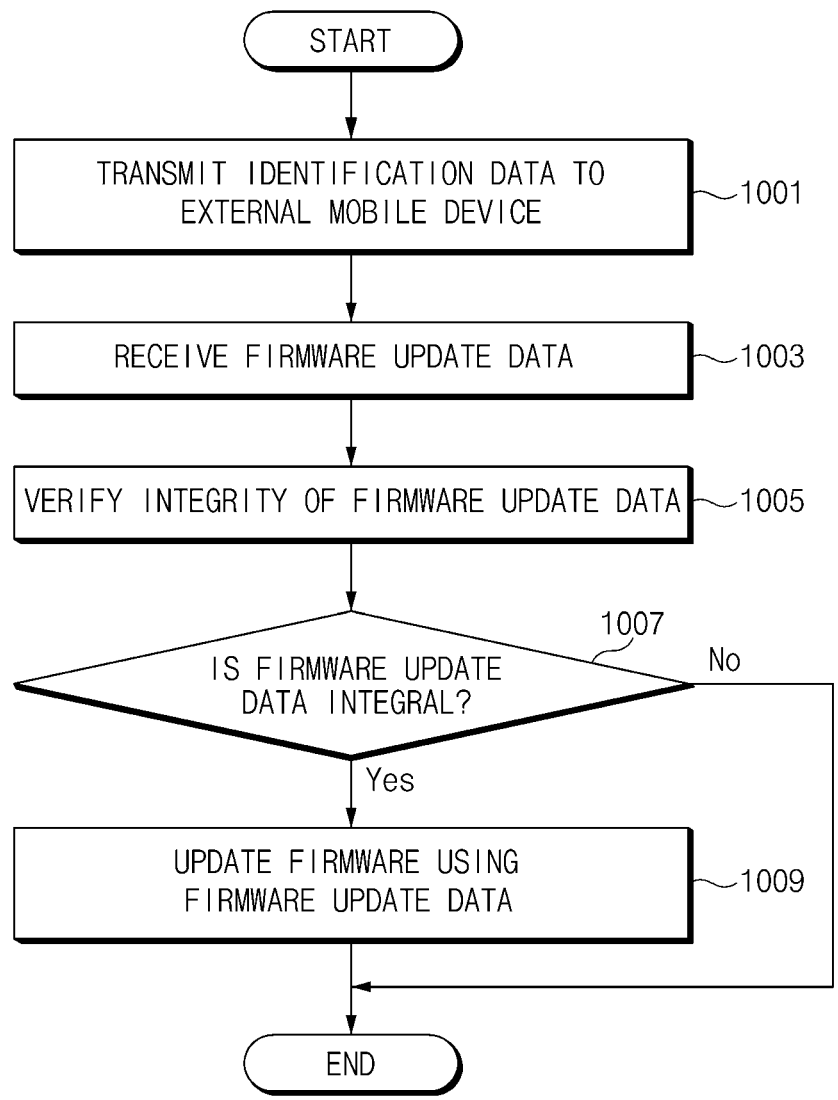
FIG. 10 is a flowchart illustrating a method for updating a firmware by an interface device according to one embodiment.

FIG. 10 is a flowchart illustrating a method for updating a firmware by an interface device according to one embodiment.

Hereinafter, it is assumed that the interface device in FIG. 1 performs a process in FIG. 10. An operation described as being performed by the interface device may be implemented as instructions that may be performed (or executed) by the processor 140 of the interface device. The instructions may be stored in, for example, a computer recording medium or the memory 120 of the interface device illustrated in FIG. 1.

Before operation 1001, the interface device and the mobile device may be connected to each other. According to an embodiment, the connector 110 of the interface device and the connector 310 of the mobile device may be connected to each other.

In operation 1001, the processor 140 of the interface device may transmit the identification data of the interface device including data associated with the firmware for the at least one IC to the mobile device.

According to an embodiment, the identification data may include at least some of the information about whether the interface device supports the security function, the information about the IC included in the interface device, and the unique serial number of the interface device. According to an embodiment, the identification data may include at least one of the firmware information (e.g., the firmware version, the recent firmware update time, or the like) of the IC included in the interface device and the data to verify whether the firmware is integral as the data associated with the firmware for the at least one IC.

According to an embodiment, operation 1001 may correspond to operation 503 in FIG. 5.

In operation 1003, the processor 140 of the interface device may receive the firmware update data for the at least one IC from the mobile device through the connector 110.

According to an embodiment, when the interface device supports the security function, the identification data of the interface device may include the information indicating that the security function is supported, and the processor 140 of the interface device may receive the secure firmware update data. In other words, the processor 140 of the interface device may receive the firmware update data corresponding to the identification data.

According to an embodiment, the processor 140 of the interface device may further receive the hash value of the firmware update data from the mobile device.

According to an embodiment, operation 1003 may correspond to operation 511 of FIG. 5.

In operation 1005, the processor 140 of the interface device may verify the integrity of the firmware update data.

According to an embodiment, the processor 140 of the interface device may verify the integrity of the firmware update data using the hash value of the firmware update data. For example, the processor 140 of the interface device may verify whether the firmware update data is forged or falsified.

According to an embodiment, operation 1003 may correspond to operation 513 in FIG. 5.

In operation 1007, the processor 140 of the interface device may determine whether the firmware update data is integral.

When the firmware update data is integral, in operation 1009, the processor 140 of the interface device may update the firmware for the at least one IC stored in the memory 120 using the firmware update data.

According to an embodiment, the processor 140 of the interface device may store the firmware update file in the memory 120. When the specified event occurs according to an embodiment, the firmware for the at least one IC stored in the memory 120 may be updated using the stored firmware update data. For example, when firmware update is not completed because of the occurrence of the error while the processor of the interface is performing the firmware update, the processor 140 of the interface device may use the stored firmware update data to update the firmware for the at least one IC stored in the memory 120.

According to an embodiment, operation 1003 may correspond to operation 515 in FIG. 5.

According to an embodiment, when the firmware update data is defective, the processor 140 of the interface device may not update the firmware.

Figure 11:
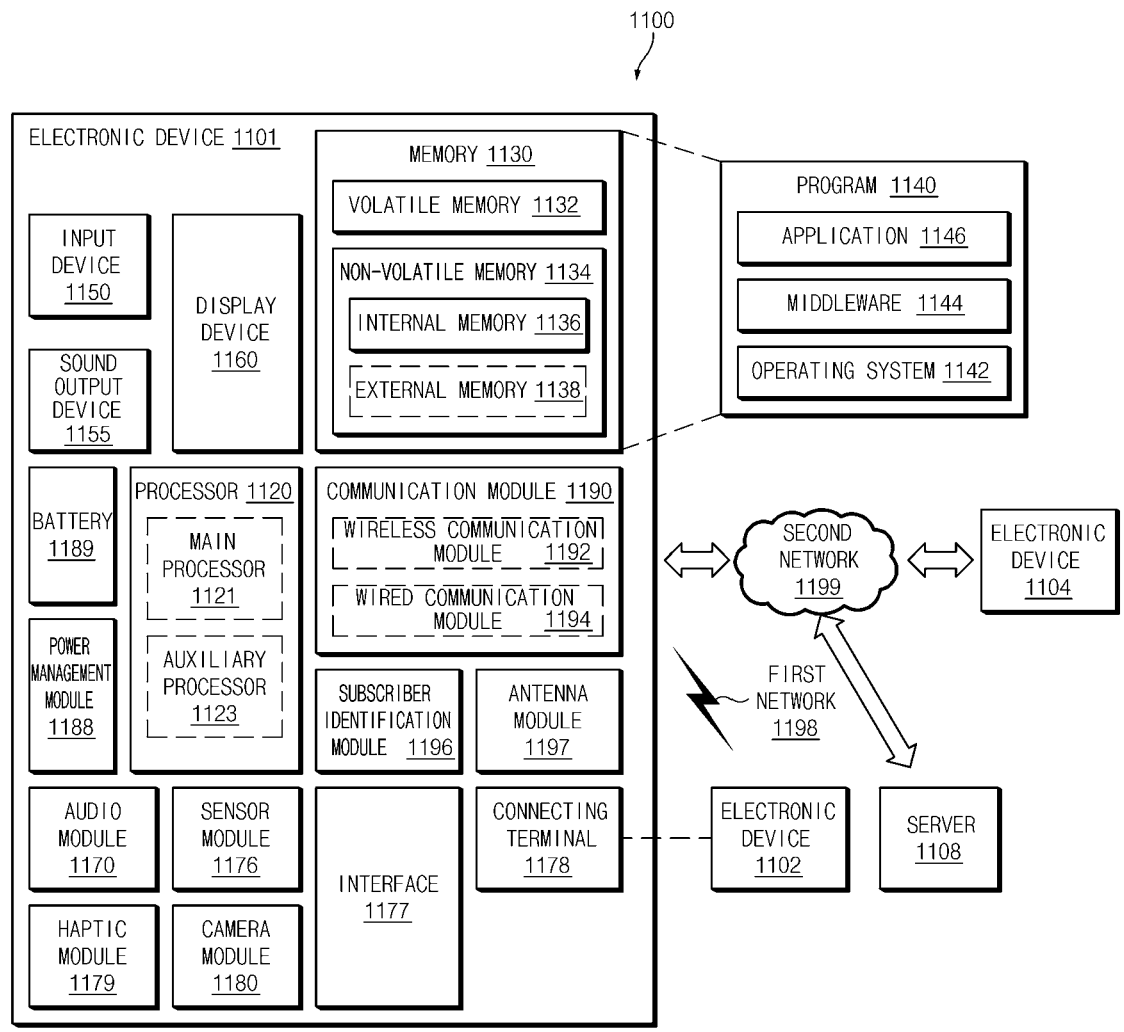
FIG. 11 is a block diagram of an electronic device in a network environment according to various embodiments.

FIG. 11 is a block diagram of an electronic device in a network environment according to various embodiments.

Referring to FIG. 11, an electronic device 1101 may communicate with an electronic device 1102 through a first network 1198 (e.g., a short-range wireless communication) or may communicate with an electronic device 1104 or a server 1108 through a second network 1199 (e.g., a long-distance wireless communication) in a network environment 1100. According to an embodiment, the electronic device 1101 may communicate with the electronic device 1104 through the server 1108. According to an embodiment, the electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module 1196, and an antenna module 1197. According to some embodiments, at least one (e.g., the display device 1160 or the camera module 1180) among components of the electronic device 1101 may be omitted or other components may be added to the electronic device 1101. According to some embodiments, some components may be integrated and implemented as in the case of the sensor module 1176 (e.g., a fingerprint sensor, an iris sensor, or an illuminance sensor) embedded in the display device 1160 (e.g., a display).

The processor 1120 may operate, for example, software (e.g., a program 1140) to control at least one of other components (e.g., a hardware or software component) of the electronic device 1101 connected to the processor 1120 and may process and compute a variety of data. The processor 1120 may load a command set or data, which is received from other components (e.g., the sensor module 1176 or the communication module 1190), into a volatile memory 1132, may process the loaded command or data, and may store result data into a nonvolatile memory 1134. According to an embodiment, the processor 1120 may include a main processor 1121 (e.g., a central processing unit or an application processor) and an auxiliary processor 1123 (e.g., a graphic processing device, an image signal processor, a sensor hub processor, or a communication processor), which operates independently from the main processor 1121, additionally or alternatively uses less power than the main processor 1121, or is specified to a specified function. In this case, the auxiliary processor 1123 may operate separately from the main processor 1121 or embedded.

In this case, the auxiliary processor 1123 may control, for example, at least some of functions or states associated with at least one component (e.g., the display device 1160, the sensor module 1176, or the communication module 1190) among the components of the electronic device 1101 instead of the main processor 1121 while the main processor 1121 is in an inactive (e.g., sleep) state or together with the main processor 1121 while the main processor 1121 is in an active (e.g., an application execution) state. According to an embodiment, the auxiliary processor 1123 (e.g., the image signal processor or the communication processor) may be implemented as a part of another component (e.g., the camera module 1180 or the communication module 1190) that is functionally related to the auxiliary processor 1123. The memory 1130 may store a variety of data used by at least one component (e.g., the processor 1120 or the sensor module 1176) of the electronic device 1101, for example, software (e.g., the program 1140) and input data or output data with respect to commands associated with the software. The memory 1130 may include the volatile memory 1132 or the nonvolatile memory 1134.

The program 1140 may be stored in the memory 1130 as software and may include, for example, an operating system 1142, a middleware 1144, or an application 1146.

The input device 1150 may be a device for receiving a command or data, which is used for a component (e.g., the processor 1120) of the electronic device 1101, from an outside (e.g., a user) of the electronic device 1101 and may include, for example, a microphone, a mouse, or a keyboard.

The sound output device 1155 may be a device for outputting a sound signal to the outside of the electronic device 1101 and may include, for example, a speaker used for general purposes, such as multimedia play or recordings play, and a receiver used only for receiving calls. According to an embodiment, the receiver and the speaker may be either integrally or separately implemented.

The display device 1160 may be a device for visually presenting information to the user of the electronic device 1101 and may include, for example, a display, a hologram device, or a projector and a control circuit for controlling a corresponding device. According to an embodiment, the display device 1160 may include a touch circuitry or a pressure sensor for measuring an intensity of pressure on the touch.

The audio module 1170 may convert a sound and an electrical signal in dual directions. According to an embodiment, the audio module 1170 may obtain the sound through the input device 1150 or may output the sound through an external electronic device (e.g., the electronic device 1102 (e.g., a speaker or a headphone)) wired or wirelessly connected to the sound output device 1155 or the electronic device 1101.

The sensor module 1176 may generate an electrical signal or a data value corresponding to an operating state (e.g., power or temperature) inside or an environmental state outside the electronic device 1101. The sensor module 1176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1177 may support a specified protocol wired or wirelessly connected to the external electronic device (e.g., the electronic device 1102). According to an embodiment, the interface 1177 may include, for example, an HDMI (high-definition multimedia interface), a USB (universal serial bus) interface, an SD card interface, or an audio interface.

A connecting terminal 1178 may include a connector that physically connects the electronic device 1101 to the external electronic device (e.g., the electronic device 1102), for example, an HDMI connector, a USB connector, an SD card connector, or an audio connector (e.g., a headphone connector).

The haptic module 1179 may convert an electrical signal to a mechanical stimulation (e.g., vibration or movement) or an electrical stimulation perceived by the user through tactile or kinesthetic sensations. The haptic module 1179 may include, for example, a motor, a piezoelectric element, or an electric stimulator.

The camera module 1180 may shoot a still image or a video image. According to an embodiment, the camera module 1180 may include, for example, at least one lens, an image sensor, an image signal processor, or a flash.

The power management module 1188 may be a module for managing power supplied to the electronic device 1101 and may serve as at least a part of a power management integrated circuit (PMIC).

The battery 1189 may be a device for supplying power to at least one component of the electronic device 1101 and may include, for example, a non-rechargeable (primary) battery, a rechargeable (secondary) battery, or a fuel cell.

The communication module 1190 may establish a wired or wireless communication channel between the electronic device 1101 and the external electronic device (e.g., the electronic device 1102, the electronic device 1104, or the server 1108) and support communication execution through the established communication channel. The communication module 1190 may include at least one communication processor operating independently from the processor 1120 (e.g., the application processor) and supporting the wired communication or the wireless communication. According to an embodiment, the communication module 1190 may include a wireless communication module 1192 (e.g., a cellular communication module, a short-range wireless communication module, or a GNSS (global navigation satellite system) communication module) or a wired communication module 1194 (e.g., an LAN (local area network) communication module or a power line communication module) and may communicate with the external electronic device using a corresponding communication module among them through the first network 1198 (e.g., the short-range communication network such as a Bluetooth, a WiFi direct, or an IrDA (infrared data association)) or the second network 1199 (e.g., the long-distance wireless communication network such as a cellular network, an internet, or a computer network (e.g., LAN or WAN)). The above-mentioned various communication modules 1190 may be implemented into one chip or into separate chips, respectively.

According to an embodiment, the wireless communication module 1192 may identify and authenticate the electronic device 1101 using user information stored in the subscriber identification module 1196 in the communication network.

The antenna module 1197 may include one or more antennas to transmit or receive the signal or power to or from an external source. According to an embodiment, the communication module 1190 (e.g., the wireless communication module 1192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1101 and the external electronic device 1104 through the server 1108 connected to the second network 1199. Each of the electronic devices 1102 and 1104 may be the same as or different types as or from the electronic device 1101. According to an embodiment, all or some of the operations performed by the electronic device 1101 may be performed by another electronic device or a plurality of external electronic devices. When the electronic device 1101 performs some functions or services automatically or by request, the electronic device 1101 may request the external electronic device to perform at least some of the functions related to the functions or services, in addition to or instead of performing the functions or services by itself. The external electronic device receiving the request may carry out the requested function or the additional function and transmit the result to the electronic device 1101. The electronic device 1101 may provide the requested functions or services based on the received result as is or after additionally processing the received result. To this end, for example, a cloud computing, distributed computing, or client-server computing technology may be used.

An interface device connected to an external mobile device according to an embodiment disclosed in the disclosure includes a connector, at least one integrated circuit (IC), a memory storing firmware and instructions for the at least one IC, and at least one processor, wherein the processor executes the instructions to, when being connected to the external mobile device through the connector, transmit identification data of the interface device including data associated with the firmware to the external mobile device through the connector, receive firmware update data corresponding to the identification data and for the at least one IC from the external mobile device through the connector, verify integrity of the firmware update data, and update the firmware stored in the memory using the firmware update data when the firmware update data is integral.

In an embodiment, the data associated with the firmware may include at least one of data for verifying the integrity of the firmware and a version of the firmware.

In an embodiment, the processor may further receive a hash value of the firmware update data from the external mobile device, and verify the integrity of the firmware update data using the received hash value of the firmware update data.

In an embodiment, the processor may generate a hash value of the updated firmware and store the generated hash value of the firmware in the memory, and update the firmware stored in the memory and then verify the integrity of the firmware stored in the memory using the stored hash value of the firmware.

In an embodiment, the processor may periodically verify the integrity of the firmware stored in the memory using the stored hash value of the firmware.

In an embodiment, the processor may verify the integrity of the firmware stored in the memory using the stored hash value of the firmware when the interface device is powered on.

In an embodiment, the processor may store the received firmware update data in the memory, and update the firmware stored in the memory using the stored firmware update data when a specified event occurs.

In an embodiment, the interface device may include a plurality of ICs, wherein the processor may transmit identification data of the interface device including data associated with firmware for the plurality of ICs to the external mobile device through the connector, receive firmware update data for the plurality of ICs from the external mobile device through the connector, verify integrity of firmware update data for a first IC that is some of the plurality of ICs, and update firmware for the first IC stored in the memory using the firmware update data for the first IC when the firmware update data for the first IC is integral.

In an embodiment, the processor may update, using firmware update data for a second IC that is some of the others of the plurality of ICs, firmware for the second IC stored in the memory.

In an embodiment, the first IC may be set to update the firmware in a secure firmware update method.

In addition, an electronic device according to an embodiment disclosed in the disclosure includes a connector, a wireless communication circuit, a memory storing instructions, and at least one processor, wherein the processor executes the instructions to, when being connected to an external interface device through the connector, receive identification data of the external interface device including data associated with firmware associated with at least one IC included in the external interface device from the external interface device through the connector, determine whether the external interface device satisfies a specified condition based at least on the identification data, request firmware update data associated with the at least one IC to an external server through the wireless communication circuit based on the identification data when the external interface device satisfies the specified condition, receive the firmware update data associated with the at least one IC from the external server through the wireless communication circuit, and transmit the received firmware update data for the at least one IC to the external interface device through the connector.

In an embodiment, the operation of requesting the firmware update data to the external server through the wireless communication circuit may include an operation of requesting, when it is determined that the external interface device supports a security function based on the identification data, secure firmware update data corresponding to the security function to the external server through the wireless communication circuit.

In an embodiment, the operation of requesting the firmware update data to the external server through the wireless communication circuit may include an operation of requesting, when it is determined that the external interface device does not support a security function based on the identification data, non-secure firmware update data to the external server through the wireless communication circuit.

In an embodiment, the electronic device may further include a touchscreen display, wherein the processor may receive a user input of selecting an IC to update firmware among the at least one IC through the touchscreen display, wherein the operation of requesting the firmware update data to the external server through the wireless communication circuit may include an operation of requesting firmware update data for the selected IC to the external server through the wireless communication circuit.

In an embodiment, the processor may receive identification data of the external interface device including data associated with firmware associated with a plurality of ICs included in the external interface device from the external interface device through the connector, wherein the operation of requesting the firmware update data to the external server through the wireless communication circuit may include an operation of requesting secure firmware update data for a first IC that is some of the plurality of ICs and non-secure firmware update data for a second IC that is some of the others of the plurality of ICs to the external server through the wireless communication circuit.

In addition, a method for updating firmware by an interface device according to an embodiment includes transmitting identification data of the interface device including data associated with firmware associated with at least one IC to an external mobile device when being connected to the external mobile device, receiving firmware update data corresponding to the identification data and for the at least one IC from the external mobile device, verifying integrity of the firmware update data, and updating the firmware stored in a memory and associated with the at least one IC using the firmware update data when the firmware update data is integral.

In an embodiment, the data associated with the firmware associated with the at least one IC may include data associated with at least one of data for verifying the integrity of the firmware and a version of the firmware.

In an embodiment, the receiving of the firmware update data associated with the at least one IC may include further receiving a hash value of the firmware update data from the external mobile device, and may further include verifying the integrity of the firmware update data using the received hash value of the firmware update data.

In an embodiment, the method may further include generating a hash value of the updated firmware and storing the generated hash value of the firmware, and updating the firmware and then verifying integrity of the firmware for the at least one IC using the stored hash value of the firmware.

In an embodiment, the method may further include storing the received firmware update data, and updating the firmware stored in the memory and associated with the at least one IC using the stored firmware update data when a specified event occurs.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1540) including an instruction stored in a machine-readable storage media (e.g., an internal memory 1536 or an external memory 1538) readable by a machine (e.g., a computer). The machine may be a device that calls the instruction from the machine-readable storage media and operates depending on the called instruction and may include the electronic device (e.g., the electronic device 1501). When the instruction is executed by the processor (e.g., the processor 1520), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding component prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

The invention claimed is:

1. An interface device connected to an external mobile device, the interface device comprising:
    a connector;
    at least one integrated circuit (IC);
    a memory for storing firmware and instructions for the at least one IC; and
    at least one processor, wherein the processor executes the instructions to:
    when being connected to the external mobile device through the connector, transmit identification data of the interface device including data associated with the firmware to the external mobile device through the connector, wherein the identification data includes information about whether the interface device supports a security function and a serial number of the interface device;
    according to the interface device being verified to be a genuine product using the serial number, receive secure firmware update data or non-secure firmware update data corresponding to whether the interface device supports the security function from the external mobile device through the connector;
    in response to receiving the secure firmware update data, verify integrity of the firmware update data and update the firmware stored in the memory using the firmware update data when the firmware update data is integral; and
    in response to receiving the non-secure firmware update data, update the firmware stored in the memory using the firmware update data without integrity verification of the firmware update data.

2. The interface device of claim 1, wherein the data associated with the firmware includes at least one of data for verifying the integrity of the firmware and a version of the firmware.

3. The interface device of claim 1, wherein the processor is configured to:
    further receive a hash value of the secure firmware update data from the external mobile device; and
    verify the integrity of the firmware update data using the received hash value of the firmware update data.

4. The interface device of claim 1, wherein the processor is configured to:
    generate a hash value of the updated firmware and store the generated hash value in the memory; and
    after updating the firmware stored in the memory, verify the integrity of the firmware stored in the memory using the stored hash value.

5. The interface device of claim 4, wherein the processor is configured to periodically verify the integrity of the firmware stored in the memory using the stored hash value.

6. The interface device of claim 4, wherein the processor is configured to verify the integrity of the firmware stored in the memory using the stored hash value when the interface device is powered on.

7. The interface device of claim 1, wherein the processor is configured to:
    store the received firmware update data in the memory; and
    update the firmware stored in the memory using the stored firmware update data when a specified event occurs.

8. The interface device of claim 1, wherein the interface device includes a plurality of ICs,
    wherein the processor is configured to:
    transmit identification data of the interface device including data associated with firmware for the plurality of ICs to the external mobile device through the connector;
    receive firmware update data for the plurality of ICs from the external mobile device through the connector;
    verify integrity of firmware update data for a first IC among the plurality of ICs; and
    update firmware for the first IC stored in the memory using the firmware update data for the first IC when the firmware update data for the first IC is integral.

9. The interface device of claim 8, wherein:
    the plurality of ICs comprises the first IC and a remainder of the plurality of ICs; and
    the processor is configured to update, using firmware update data for a second IC among the remainder of the plurality of ICs, firmware for the second IC stored in the memory.

10. The interface device of claim 8, wherein the first IC is set to update the firmware in a secure firmware update method.

11. An electronic device comprising:
    a connector;
    a wireless communication circuit;
    a memory storing instructions; and
    at least one processor, wherein the processor executes the instructions to:
    when being connected to an external interface device through the connector, receive identification data of the external interface device including data associated with firmware associated with at least one IC included in the external interface device from the external interface device through the connector, wherein the identification data includes information about whether the external interface device supports a security function and a serial number of the external interface device;
    determine whether the external interface device is a genuine product, based on the serial number;
    according to a determination that the external interface device is the genuine product, request firmware update data associated with the at least one IC to an external server through the wireless communication circuit based on the identification data;
    receive secure firmware update data or non-secure firmware update data corresponding to whether the external interface device supports the security function from the external server through the wireless communication circuit; and transmit the received firmware update data for the at least one IC to the external interface device through the connector, and wherein a firmware update based on the secure firmware update data requires integrity verification before update, and a firmware update based on the non-secure firmware update data does not requires integrity verification.

12. The electronic device of claim 11, wherein the processor is configured to request the firmware update data to the external server through the wireless communication circuit by:

when it is determined that the external interface device supports a security function based on the identification data, requesting secure firmware update data corresponding to the security function to the external server through the wireless communication circuit.

13. The electronic device of claim 11, wherein the processor is configured to request the firmware update data to the external server through the wireless communication circuit by:

when it is determined that the external interface device does not support a security function based on the identification data, requesting the non-secure firmware update data to the external server through the wireless communication circuit.

14. The electronic device of claim 11, further comprising: a touchscreen display, wherein the processor is configured to:

receive a user input of selecting an IC to update firmware among the at least one IC through the touchscreen display, request the firmware update data to the external server through the wireless communication circuit by:

requesting firmware update data for the selected IC to the external server through the wireless communication circuit.

15. The electronic device of claim 11, wherein the processor is configured to:

receive identification data of the external interface device including data associated with firmware associated with a plurality of ICs included in the external interface device from the external interface device through the connector, request the firmware update data to the external server through the wireless communication circuit by:

requesting the secure firmware update data for a first IC among the plurality of ICs and the non-secure firmware update data for a second IC among a remainder of the plurality of ICs to the external server through the wireless communication circuit, wherein the plurality of ICs comprises the first IC and the remainder of the plurality of ICs.

* * * * *